United States Patent [19]

Kelkar et al.

[11] Patent Number: 4,925,492
[45] Date of Patent: May 15, 1990

[54] CERAMIC CORE FOR INVESTMENT CASTING AND METHOD FOR PREPARATION

[75] Inventors: Anant H. Kelkar, Nanuet, N.Y.; Frank A. Capodicasa, Woodcliff Lake, N.J.; Jerry G. Weinstein, Newark, Del.

[73] Assignee: The Interlake Corporation, Oak Brook, Ill.

[21] Appl. No.: 99,080

[22] Filed: Sep. 21, 1987

[51] Int. Cl.$^5$ .............................................. B28B 7/28
[52] U.S. Cl. .............................. 106/38.35; 106/38.27; 106/38.22; 106/38.9; 164/516; 164/518; 164/522
[58] Field of Search ............... 106/38.35, 38.22, 38.27, 106/38.9; 164/516, 518, 522

[56] References Cited

U.S. PATENT DOCUMENTS

| 2,372,236 | 3/1945 | Wainer | 106/38.9 |
| 3,407,864 | 10/1968 | Anderko et al. | 164/522 |
| 3,548,914 | 12/1970 | Hill et al. | 164/522 |
| 3,645,491 | 2/1972 | Brown et al. | 164/522 |
| 4,361,181 | 11/1982 | Wischnack et al. | 164/522 |
| 4,438,804 | 3/1984 | Aiga et al. | 164/522 |
| 4,629,708 | 12/1986 | Alexander et al. | 164/522 |

FOREIGN PATENT DOCUMENTS

| 0103826 | 2/1973 | Japan | 106/38.35 |
| 871988 | 8/1978 | U.S.S.R. | 164/517 |

Primary Examiner—William R. Dixon, Jr.
Assistant Examiner—Chris Gallo
Attorney, Agent, or Firm—Klauber & Jackson

[57] ABSTRACT

A fired ceramic core for use in aluminum investment casting, which will withstand steam autoclaving and which may be rendered water disruptible; comprising from about 20 to 50% by weight of one or more water soluble salts, together with inert ceramic fillers selected to meet desired thermoexpansion compatability for the shell with which said core is to be used; said core being vacuum impregnated with ethyl silicate and a cured phenolic resin.

14 Claims, No Drawings

CERAMIC CORE FOR INVESTMENT CASTING AND METHOD FOR PREPARATION

BACKGROUND OF INVENTION

This invention relates generally to investment casting, and more specifically relates to water disruptible cores useful in investment casting procedures, and to the method of preparation of such cores.

In the well-known procedures applicable to investment casting, a precise wax pattern is initially prepared corresponding to the metal article intended for ultimate manufacture. The wax pattern is thereupon repeatedly coated or "invested" with particulate ceramic material, so as to build up a ceramic shell mold of a desired thickness. Since the article to be manufactured often includes complex openings, cavities and the like, one or more ceramic cores are commonly disposed with respect to the wax pattern, so that when the wax is later removed from the shell mold, the cores remain in place, to form the appropriate cavities and the like, when the final metal casting is prepared.

Several techniques are known for removing the wax pattern from the thus formed shell mold. Among the most common and acceptable is the use of high pressure and high temperature steam, which is accomplished by subjecting the shell-encased wax pattern to autoclaving. Once the wax is thus removed, the shell mold is fired in a furnace to remove wax residue and moisture and then the shell mold carrying the core or cores is ready for use for casting of the metal article.

Upon the metal casting being completed, the ceramic core or cores must be removed from the cast article. In many instances this can be readily assured by forming the core from a material which is soluble in caustic alkali. However, this procedure cannot be used where one desires to cast metals or alloys such as aluminum, because in these instances the metal or alloys would themselves be chemically attacked by the caustic alkali. Accordingly, where casting of aluminum and similar metals and alloys are involved, it has been known in the prior art to form the ceramic cores of a material which is soluble, or at least includes sufficient soluble portions as to be thoroughly disruptible by water, so that after the casting is prepared, the core or cores remaining with the casting may be removed by use of water. Prior commercially available cores, of this type however, have not been capable of satisfactorily withstanding the autoclaving conditions which are discussed above, and which constitute an intermediate step to which the core is subjected prior to its use in casting.

Prior art disclosures of water soluble or disruptible cores of the general type discussed above, include, for example, U.S. Pat. No. 4,629,708. The core described in this patent is a refractory body based upon a water soluble salt and a calcium silicate, the latter being present in amount of at least 45% by weight. The water soluble salt and the calcium silicate have a specified particle size distribution, and the calcium silicate is preferably a wollastonite. The patent discloses that this core may be removed from the cast or molded article by dissolution in water. The said patent also states that one can enhance the resistance of bodies made according to same to adventitious water, e.g., during storage or transport, by treating the cores after forming with a waterproofing material material. The cores may thus be coated and slightly impregnated by dipping them in an unsaturated polyester resin, which may then be cured to give a surface coating providing increased strength and resistance to water attack. This coating is burned off either before or during the casting process.

U.S. Pat. No. 4,361,181 discloses a casting core produced from a granular based substance, in a sugar derivative as binding agent.

U.S. Pat. No. 3,407,864 discloses use of a fugitive core comprising at least one soluble metal halide salt, and up to about 10% be weight of at least one second constituent selected from the group consisting of borax, magnesium oxide and talc. The patent teaches that it is preferred, for economic reasons, to use sodium or potassium chloride as the metal halide salt. One example of a core made according to the patent contains 95 weight percent sodium chloride, 3 weight percent borax, 1 weight percent magnesium oxide, and 1 weight percent talc.

U.S. Pat. No. 3,645,491 discloses water-soluble cores for use in the casting of metals, which consist of a water-soluble salt and a synthetic resin. The soluble core may consist of a mixture of the water-soluble salt and a liquid resin binder such as to retain the salt grains in the agglomerate; or alternatively, the soluble core may consist of grains of a water-soluble salt, preferably of a controlled grain size which are coated with a synthetic resin and subsequently dried to a powder. One example of the core composition consists of granular sodium chloride, bonded together in an agglomerate by a synthetic resin of a phenol formaldehyde-furfuryl alcohol type.

U.S. Pat. No. 3,548,914 discloses soluble cores comprising a mixture of sodium chloride and sodium silicate, or sodium sulfate and sodium silicate.

U.S. Pat. No. 4,438,804 discloses a water-soluble core prepared from a mixture of sand, potassium carbonate as a first binder, and at least one of barium carbonate and alkali silicate as a second binder.

As indicated, the principal problem to which the present invention is addressed is imposed by the use of the high pressure steam and temperatures which occur during the autoclaving step which has been previously discussed. Steam temperatures during autoclaving are typically of the order of 340° to 350° F., accompanied by pressures of about 100 psi. While the prior art water soluble core structures, for example of the types above discussed, have in many instances performed successfully with respect to their ability to be dissolved or disrupted by water, the prior art known cores have not been able to successfully withstand the said autoclaving conditions. Very typically, when a prior art core is thus subjected to autoclaving, the water-soluble salts present in same are found to undergo leaching. This weakens, and indeed may begin to disrupt the entire core structure; and at a minimum, will produce a leached residue of salt on the surface of the core. When such a core is thereupon utilized in the subsequent molding operation, the presence of such salts at the core surface, produces an unacceptable casting.

Another difficulty found with certain of the prior art cores, arises from too high thermal expansion characteristics. This can occur, for example, where the sodium chloride content is too high. Lowering the sodium chloride content will reduce the coefficient of thermal expansion, but depending upon the replacement components, leachability may be lost in the fired core—which defeats the purpose of using same.

In accordance with the foregoing, it may be regarded as an object of the present invention to provide a nonferrous ceramic core for use in investment casting procedures, which is readily disruptible by water following the casting operation, but which, further, possesses appropriate characteristics as to enable the core to fully withstand the autoclaving conditions which are commonly incident to the investment casting procedures.

A further object of the invention, is to provide ceramic cores as aforementioned, which have low thermal expansion characteristics, and good leachability as will facilitate removal of the cores following their use in casting.

SUMMARY OF INVENTION

Now in accordance with the present invention, the foregoing objects and others, as will become apparent in the course of the ensuing specification, are achieved in a nonferrous ceramic core, which is prepared from a green mix which can include from about 20% to 50% by weight of a water soluble salt, together with inert ceramic fillers such as silica and zircon, with the fillers being selected to meet a desired TCE compatibility with the ceramic shell with which the cores are to be used; and together further with temporary binders. In a preferred formulation the green mix can include from 20 to 30% by weight of sodium chloride, from 15 to 20% be weight of fused silica, and from 40 to 50% by weight of zircon, together with appropriate temporary binders. Typically from about 1 to 5% by weight of potassium or sodium bromide is preferably also present in the mix as an aid to avoiding processing distortions. The green mix is heat molded into the desired core shape, after which the body is packed and fired. The resulting ceramic core is thereupon treated to increase the resistance of same to disruption or damage by autoclaving, by subjecting the body to vacuum impregnation with ethyl silicate, and with a phenolic resin which is subsequently heat cured. It is found that when cores are produced in accordance with the invention, they will effectively withstand the steam temperatures and pressures of steam autoclaving without leaching the soluble salts and yet will be readily disruptible by conventional water treatment techniques following the casting operation.

Thus in accordance with a further aspect of the invention, there is provided a fired ceramic core for use in aluminum investment casting, which will withstand steam autoclaving and which may be rendered water disruptible, comprising from about 20 to 50% by weight of one or more water soluble salts, together with inert ceramic fillers selected to meet desired thermoexpansion compatibility for the shell with which the core is to be used; and wherein the core is vacuum impregnated with ethyl silicate and a cured phenolic resin.

DESCRIPTION OF PREFERRED EMBODIMENT

In a typical procedure in accordance with the method of the present invention, the green mix to be used in preparing the ceramic cores may include from about 20 to 30% sodium chloride, 15 to 20% fused silica, 40 to 50% of zircon, and from about 1 to 5% by weight of potassium (or sodium) bromide.

The temporary binders utilized serve to enable moldability of the green mix, and preferably comprise a paraffin wax having a melting point of the order of 160° F., and in the range of about 10 to 13% by weight (of the green mix); and from 0.2 to about 2% by weight (of the green mix) of castor oil or oleic acid. This green mix is typically injection molded to form the desired core shape at temperatures of about 175° to 195° F. After the molding, the cores are stabilized at room temperature before being sand-packed in a sagger where they are subjected to a heat schedule, to about 650° F. to effect charring. The cores are then removed and brushed, and placed on a ceramic plate and heated to about 1375° to 1525° F. for two to eight hours to achieve the strength necessary for practical handling.

The products are now ready for surface treatment in accordance with the invention. In a preferred procedure, this is accomplished by first soaking the core under vacuum conditions in a solution of ethyl silicate, followed by heating and drying. The article is then soaked in a phenolic resin, and cured at 300° to 400° F. for a period of about one-half to two hours. The article is preferably then further soaked in ethyl silicate and heat dried. Following this, it is preferable to spray the article with a slurry of a water insoluble ceramic powder such as zirconia, followed by drying and heating to about 800° to 1000° F., in order to provide further protection for the article.

During the investment casting procedures, the resulting cores will be subjected to steam autoclaving conditions at typically 100 to 120 psi and 340° to 350° F. However, it is found, by virtue of the methods and materials used to prepare the core, that no observable damage is caused by the harsh steam autoclaving conditions, including an detectable leaching of the soluble salts to the surface of the core—as has been evident in prior art procedures. After wax removal from the mold and before use in casting, the shell (including the ceramic core or cores), as is known in the art, is brought to temperatures of approximately 1200° to 1300° F. to remove any residual wax, at which temperature the phenolic resin in the core is thoroughly burned out, which then renders the core leachable. Subsequently, the shell mold is typically brought to a temperature of about 400° to 500° F., and the aluminum or similar alloy poured. When the cast article is thereafter recovered, the core or cores remaining with same are found to be readily leachable by water and accompanying mechanical impact—as for example by a stream of water impinging on same, whereby the cores are readily removed.

The invention if further illustrated in the following Examples, which are deemed to be exemplary only of the invention, and are not to be considered delimitative of the invention otherwise disclosed and claimed herein:

EXAMPLE 1

In accordance with the present invention, a green mix was initially prepared from the following components:

| Component | Parts by Weight |
| --- | --- |
| paraffin wax - melting point of about 160° F. | 12.44 |
| castor oil | 0.6 |
| sodium chloride | 23.0 |
| fused silica (−60 mesh) | 17.9 |
| zircon 200 mesh | 44.7 |
| potassium bromide (−230 mesh) | 2.22 |

The sodium chloride, potassium bromide and zircon flour were ground in a ceramic ball mill for two hours, after which all the dry ingredients (including the fused silica) were thoroughly mixed. The wax was thereupon melted, the castor oil added, and the temperature raised to 200° F. The premixed ceramic powders were wetted by the molten wax in a mixer, and the entire mixture was then thoroughly blended, after after which it was vacuumed to remove air bubbles. The temperature was then lowered to 190° to 195° F. and the material was transferred to an injection press. After injection molding, the cores were allowed to stabilize at room temperature before being placed in a sagger.

The cores were packed in packing sand (75% alumina, 25% zirconia) in a sagger, and thereupon heated at a rate of 20° to 60° F. per hour up to approximately 600° F. where it was held for several hours, after which the furnace was permitted to cool to room temperature overnight. The cores were then removed and brushed and cleaned with a low pressure air hose. Thereupon the cores were placed upon a ceramic plate, and the temperature was raised to approximately 1400° F., where it was held for two hours. More typically in the sintering operation, temperatures are in the range of about 1375° to 1525° F., for a period of from about two to eight hours.

The cores were allowed to cool overnight and were then removed for the soaking treatment and impregnation procedure.

The cores were soaked in a solution of ethyl silicate (Silbond® H-5 prehydrolized product of Stauffer Chemical Co.) for two minutes under vacuum to obtain good absorption, and were then air dried at room temperature and oven dried for one hour at 140° F., and then cooled to room temperature outside of the oven. Following this, the cores were soaked in a phenolic resin, specifically the FB-130 product of Borden Chemicals, Inc., as a 50/50 mixture by volume of the resin with methanol for two minutes under vacuum, then air dried for one hour at room temperature, and oven dried one hour at 140° F. The oven temperature was then raised to 350° F. for curing for two hours, and the cores were then cooled to room temperature out of the oven.

Ethyl silicate was then reapplied by soaking the cores under vacuum and then drying for one hour, and then oven drying for one hour at 140° F., after which the cores were cooled to room temperature. This procedure was repeated, after which the cores were substantially ready to be used; except that as a further technique, additional protection for the cores was provided by spraying same with a zirconia slurry using a spray gun or other procedure. The cores were then dried overnight, and cured at 900° F. in an electric oven.

In order to determine the quantities of ethyl silicate and of phenolic resin impregnated into typical cores produced by the prior procedures, a series of cores were subjected to the processing indicated, and the weight increases measured after the impregnating steps. It was found that the first ethyl silicate impregnation averaged 2.2% by weight of the cores; the content of resin and silicate (following resin impregnation and heat curing) averaged 7.9%; and content of ethyl silicate and resin following the second ethyl silicate impregnation averaged 11.4%. More generally the procedure results in ethyl silicate addition of about 2 to 7%, and resin of about 3 to 8% by weight of the core.

The cores produced in accordance with this Example can be used in conventional investment casting procedures as previously outlined; and when during the course of same, they are subjected to steam autoclaving conditions, typically, for example, at temperatures of 340° to 350° F., and pressures of 100 to 120 psi, for periods of 12 minutes, subsequent examination of the cores will show excellent, smooth surface characteristics with no indication of leaching of the soluble salts. Furthermore, when such cores are thereupon used in the casting of aluminum, following such operation they are readily disruptible by conventional application of water by a pressurized stream, i.e., the water will readily dissolve portions of the core by attacking the grain boundaries, to rapidly disintegrate the body.

EXAMPLE 2

The present Example illustrates that use of other types of resins, even in combination with ethyl silicate, do not provide comparable results to those yielded by practice of the present invention. In particular, in this Example, a series of cores were prepared from green mixes similar to those as in Example 1 and fired. They were then subjected to a surface treatment and impregnation procedure by first vacuum impregnating with ethyl silicate (as in Example 1) followed by air drying and oven drying. Thereafter, a solution of MASTERBOND A-01 resin, which is an epoxy type resin produced by Master Bond, Inc. which cures at room temperature, was diluted with 25% by weight methyl ethyl ketone and vacuum impregnated by procedures as previously indicated. The cores, after drying, were subjected to steam autoclaving for 3 minutes at 100 psi and 20 minutes at 15 psi at a temperature of 240° F. The surface of the cores appeared relatively good with some salt being seen, however. They were then fired to 1200° F. A powder was seen on the surface, which was dissolvable in water after 10 minutes.

In a further application of the A-01 MASTERBOND resin as indicated, several successive applications were effected. After steam autoclaving, the surface was found to be bubbly and unsatisfactory.

A similar procedure to that just indicated was carried out using a Dow Corning 806-A silicone resin, which was impregnated into fired cores by the procedures indicated and cured. Examination of the surface following the same autoclaving procedures showed a fine salt deposit, and in variations on the use of the Dow Corning resin, lumpy salt deposits under a relatively rubbery skin of resin were observed. After firing to 1200° F., a powdery film could be observed upon the cores, where these resins were used.

A similar procedure to that indicated above, was carried out using an unsaturated polyester resin, i.e., the MR 1305-5 product of Aristech Co. This was combined with prepenzoate hardener and was applied on fired ceramic cores. The cores were dipped in the solution for 15 seconds, then removed and air dried for 1 hour, oven dried at 140° F. for 1 hour, cured at 270° F. for 1 hour, and then cooled to room temperature.

The treated cores were subjected to a steam autoclave cycle of 80 psi for 10 minutes. The cores showed a rough surface due to salt coming out to the surface.

EXAMPLE 3

In this further comparative example, phenolic resins alone were utilized in the impregnation process—i.e., without the conjunctive use of ethyl silicate. In particular, cores were prepared by procedures similar to those of Example 1, and were fired as indicated therein. The cores were then subjected to resin treatment by being dip coated in the aforementioned Borden resin FB-130. They were immediately removed, excess resin allowed to drain, and were then dried. They were then placed in a furnace and cured at 400° F. for ½ hour. Upon cooling, the cores demonstrated a good strength; and following steam autoclaving, external examination did not indicate that the cores were unsatisfactory. However, when the cores were then used in the production of aluminum castings as previously discussed, the internal casting surfaces formed by means of the core were found to be rough and unsatisfactory. It was evident from this that the core surface was unsatisfactory, likely due to leaching of the soluble salts, and/or to other effects achieved where the phenolic phenolic resin alone is utilized.

It will be evident from the comparative Examples that the sequential process utilized in the present invention, i.e. the combination of treatment with ethyl silicate and with a phenolic resin, as set forth herein, yields a unique result, in providing a fired core which not only is capable of withstanding the harsh steam autoclaving conditions with substantially no detrimental effects; but that the said cores also possess the required properties of being disruptible when the casting is completed, and the cores must be removed in accordance with the practice of investment casting procedures.

While the present invention has been set forth in terms of specific embodiments thereof, it will be understood in view of the present disclosure that numerous variations upon the invention are now enabled to those skilled in the art, which variations yet reside within the scope of the present teaching. Accordingly, the invention is to be broadly construed, and limited only by the scope and spirit of the claims now appended hereto.

We claim:

1. In the method for preparing a refractory water-disruptible core for use in investment casting, by the steps of forming a green mix including a water soluble salt, inert ceramic fillers and a temporary binder; molding the desired core from said mix; and firing the resultant molded core; enabling said core to possess increased resistance to steam autoclaving operations incident to the said investment casting; the improvement comprising the sequential steps of
   (a) vacuum impregnating the fired core with a solution of ethyl silicate and drying the core;
   (b) vacuum impregnating said core with a phenolic resin; and
   (c) heating the impregnated core to cure the resin.

2. The method of claim 1, including the further step of reimpregnating said core from step (c) with a further application of ethyl silicate, following said heat cure step.

3. A method in accordance with claim 1 further including spraying the said core subsequent to said heat cure with a a slurry of a water insoluble ceramic powder, and drying and heating the resultant core.

4. A method for preparing a water-disruptible ceramic core for use in investment casting, comprising in sequence the steps of:
   (a) preparing a green mix, including from 20 to 30% of sodium chloride, from 15 to 20% of fused silica, and from 40 to 50% of zircon, together with temporary binders;
   (b) heat molding the said green mix into the desired core shape;
   (c) packing and firing the molded core from step (b); and
   (d) treating the fired core from step (c) to increase the resistance of same to disruption by steam autoclaving, by subjecting same to vacuum impregnation with ethyl silicate and drying followed by vacuum soaking with a phenolic resin which is subsequently heat cured.

5. The method of claim 4 wherein said step (d) is followed by vacuum reimpregnating the said resin-treated core in a further solution of ethyl silicate.

6. A method in accordance with claim 5, further including heat drying the ethyl silicate resoaked core, and thereupon spraying same with a zirconia slurry, and drying and heating the core to provide the completed product.

7. A method in accordance with claim 4, wherein said green mix includes from 1 to 5% by weight of potassium or sodium bromide.

8. A green mix for preparing a fired, water-disruptible ceramic core for use in investment casting; comprising by weight: 20 to 30% sodium chloride; 15 to 20% fused silica; 40 to 50% zircon; together with sufficient temporary binders to enable moldability of said mix.

9. A green mix in accordance with claim 8, further including from 1 to 5% by weight of one or more members selected from the group consisting of potassium and sodium bromide.

10. A green mix in accordance with claim 8, wherein said temporary binders include 10 to 13% by weight of said mix, of a wax.

11. The ceramic product resulting from firing of the green mix of claim 8 at temperatures in the range of 1375° to 1525° F.

12. A fired ceramic core for use in aluminum investment casting, which will withstand steam autoclaving and which may be rendered water-disruptible; comprising from about 20 to 50% by weight of one or more water soluble salts, together with 15 to 20% fused silica and 40 to 50% zircon by weight of said core of inert ceramic fillers; and said core having been vacuum impregnated with ethyl silicate and a phenolic resin and cured.

13. A core as in claim 12, wherein said ethyl silicate comprises from about 2 to 7% and said phenolic resin from about 3 to 8% by weight of said core.

14. A core as in claim 13, wherein said salt is sodium chloride, and is present as from 20 to 30% by weight.

* * * * *